United States Patent
Rizzo et al.

(10) Patent No.: US 7,580,694 B2
(45) Date of Patent: Aug. 25, 2009

(54) CONTACTLESS INTEGRATED CIRCUIT WITH HIGH-EFFICIENCY ELECTRICAL POWER SUPPLY CIRCUIT

(75) Inventors: Pierre Rizzo, Aix En Provence (FR); Emmanuel Bergeret, Marseilles (FR); Jean Gaubert, Marseilles (FR); Philippe Pannier, Marseilles (FR)

(73) Assignees: STMicroelectronics SA, Montrouge (FR); Universite d'Aix-Marseille I, Marseille Cedex (FR)

( * ) Notice: Subject to any disclaimer, the term of this patent is extended or adjusted under 35 U.S.C. 154(b) by 319 days.

(21) Appl. No.: 11/567,917

(22) Filed: Dec. 7, 2006

(65) Prior Publication Data
US 2007/0155357 A1    Jul. 5, 2007

(30) Foreign Application Priority Data
Dec. 8, 2005    (FR)    .................... 0512441

(51) Int. Cl.
*H04B 1/28*    (2006.01)
(52) U.S. Cl. .................. 455/333; 455/403; 455/109; 455/205; 455/226.1
(58) Field of Classification Search .............. 455/41, 455/205, 109, 333, 67.13, 550.1, 127.1, 226.1, 455/334
See application file for complete search history.

(56) References Cited

U.S. PATENT DOCUMENTS

| | | | |
|---|---|---|---|
| 4,850,035 A * | 7/1989 | Schiller | 455/109 |
| 5,982,647 A | 11/1999 | Martin et al. | |
| 2002/0056865 A1 | 5/2002 | Sadayuki | |
| 2002/0072342 A1* | 6/2002 | Charrat | 455/205 |
| 2002/0077061 A1* | 6/2002 | Charrat | 455/41 |

* cited by examiner

*Primary Examiner*—Tony T Nguyen
(74) *Attorney, Agent, or Firm*—Lisa K. Jorgenson; E. Russell Tarleton; Seed IP Law Group PLLC

(57) ABSTRACT

A circuit and method for supplying an electronic circuit with a direct supply voltage using high frequency antenna signals. The method includes producing a primary direct voltage equal to a fraction of the supply voltage using at least one antenna signal, producing at least two pumping signals having a frequency lower than the frequency of the antenna signals by means of an oscillator electrically powered by the primary voltage and boosting the primary voltage by means of a charge pump driven by the pumping signals, to obtain the supply voltage.

21 Claims, 3 Drawing Sheets

CONTACTLESS INTEGRATED CIRCUIT WITH HIGH-EFFICIENCY ELECTRICAL POWER SUPPLY CIRCUIT

BACKGROUND OF THE INVENTION

1. Field of the Invention

The present invention relates to a circuit and method for electrically supplying an electronic circuit using high frequency antenna signals.

2. Description of the Related Art

The present invention relates in particular, but not exclusively, to contactless integrated circuits operating in the presence of a UHF electric field (300 MHz-3 GHz). Such integrated circuits can be entirely passive, i.e., devoid of any autonomous source of power. They are then electrically powered exclusively using UHF antenna signals.

Figure 1:
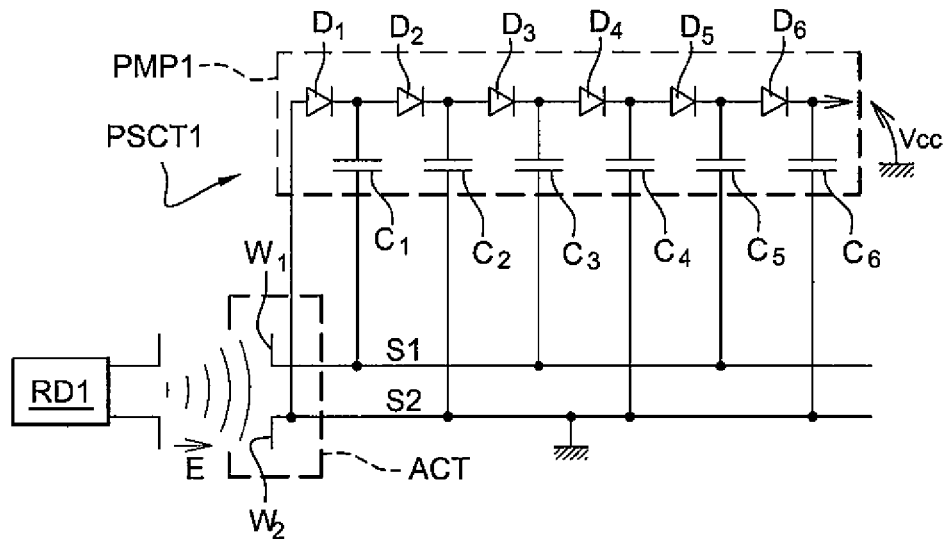

FIG. 1 represents a classic power supply circuit PSCT1 allowing a direct voltage Vcc to be produced using UHF antenna signals. The circuit PSCT1 consists of a charge pump PMP1 that is linked to an antenna circuit ACT comprising two conductors W1, W2 forming a dipole. In the presence of an electric field E situated in the UHF band, emitted for example by a contactless integrated circuit reader RD1, antenna signals S1, S2 appear in the conductors W1, W2. These antenna signals S1, S2 are sine-wave signals in opposite phase and of low amplitude, generally only a few tenths of a volt. They are applied to the charge pump PMP1 as pumping signals. The charge pump PMP1 then supplies a direct voltage Vcc in the order of one Volt to several Volts.

The charge pump PMP1 represented in FIG. 1 comprises three cascade-arranged pumping stages. The first stage comprises an input diode D1, an input capacitor C1, an output diode D2 and an output capacitor C2. The second stage comprises an input diode D3, an input capacitor C3, an output diode D4 and an output capacitor C4. The third and last stage comprises an input diode D5, an input capacitor C5, an output diode D6 and an output capacitor C6. In each stage, the cathode of the input diode D1, D3, D5 is connected to the anode of the input capacitor C1, C3, C5 and to the anode of the output diode D2, D4, D6, the cathode of which is connected to the anode of the output capacitor C2, C4, C6. The cathode of the input capacitor C1, C3, C5 is linked to the conductor W1 and receives the antenna signal S1. The cathode of the output capacitor C2, C4, C6 is linked to the conductor W2 and receives the antenna signal S2. As the stages are cascade-arranged, the cathode of the diode D2 is connected to the anode of the diode D3 and the cathode of the diode D4 is connected to the anode of the diode D6. At the charge pump input, the anode of the diode D1 is connected to the conductor W2. At the charge pump output, the capacitor C6 supplies the voltage Vcc. The conductor W2 is linked to the ground so that the voltage Vcc is not floating.

Upon each half cycle of the signals S1, S2, the cathode of the capacitors C2, C4, as well as the anode of the input diode D1, are taken to an electric potential higher than the potential present on the cathode of the capacitors C1, C3, C5. Thus, electric charges are transferred in the capacitor C1 by the signal S2 through the diode D1, and electric charges are transferred in the capacitors C3, C5 by the capacitors C2, C4 through the diodes D3, D5. Upon each next half cycle, the cathode of the capacitors C1, C3, C5 is taken to an electric potential higher than the potential present on the cathode of the capacitors C2, C4, C6. Electric charges are then transferred in the capacitors C2, C4, C6 by the capacitors C1, C3, C5 through the diodes D2, D4, D6. Thus, if Vs is the RMS voltage difference between the antenna signals S1, S2 and if Vd is the threshold voltage of the diodes, the theoretical voltage gain of each stage of the charge pump is equal to 2 Vs−2 Vd, i.e., for example 0.6 Volt if Vs is equal to 0.5 Volt and Vd equal to 0.2 Volt.

This method for converting UHF electric signals into direct voltage Vcc is frequently used to electrically power UHF passive integrated circuits.

The antenna signals S1, S2 are not however suited to obtaining good charge pump efficiency (ratio between the power supplied by the charge pump and the incident power received by the antenna circuit). It is indeed well known by those skilled in the art that a charge pump has optimal efficiency if it is driven by pumping signals that do not overlap, in perfect opposite phase, and preferably square in shape (voltage square waves). Otherwise, electric charges are not transferred optimally in the charge pump. Moreover, the very high frequency of the antenna signals S1, S2 favors electrical losses through various stray capacitances present between the components constituting the charge pump and a substrate on which these components are formed, generally a semiconductive substrate.

Due to these various technical and technological limitations reducing the efficiency of the charge pump, the direct voltage obtained is lower than the one that would be obtained with signals S1, S2 of the same amplitude but of lower frequency and having a form adapted to charge pumping.

BRIEF SUMMARY OF THE INVENTION

The embodiments of the present invention disclosed herein overcome the foregoing disadvantages through a circuit and method for producing a direct supply voltage using antenna signals to achieve a greater efficiency than the classic method described above.

In one embodiment, a method is provided for supplying an electronic circuit with a direct supply voltage using high frequency antenna signals. The method includes producing a primary direct voltage equal to a fraction of the supply voltage by using at least one antenna signal, producing at least two pumping signals having a frequency lower than the frequency of the antenna signals by means of an oscillator electrically powered by the primary voltage, and boosting the primary voltage by means of a charge pump driven by the pumping signals, to obtain the supply voltage.

According to one embodiment, the primary voltage is produced by single-wave or full-wave rectification of at least one antenna signal.

According to another aspect, the primary voltage is produced by single-stage charge pumping using a first capacitor receiving a first antenna signal on one of its terminals and a second capacitor receiving a second antenna signal on one of its terminals. Ideally, the pumping signals have a frequency between 2 and 50 MHz.

According to another embodiment, the low-voltage oscillator, the charge pump and the electronic circuit are arranged on a common semiconductor chip.

According to a further embodiment, the method is applied to an electronic circuit having a non-volatile memory, and includes a step of producing a voltage for erasing or programming the memory by boosting the supply voltage by means of a second charge pump.

The disclosed embodiments also provide an integrated circuit having an electronic circuit and a power supply circuit for supplying the electronic circuit with a direct supply voltage using alternating antenna signals, the power supply circuit including a rectifier circuit receiving at least one of the antenna signals for supplying a primary direct voltage equal to a fraction of the supply voltage, an oscillator electrically powered by the primary voltage for supplying at least two pumping signals having a frequency lower than the frequency of the antenna signals, and a charge pump driven by the pumping signals for boosting the primary voltage and producing the supply voltage.

According to one embodiment, the rectifier circuit is a single-wave rectifier or a full-wave rectifier bridge.

According to another embodiment, the rectifier circuit is a single stage of a charge pump having a capacitor receiving a first antenna signal on one of its terminals and a second capacitor receiving a second antenna signal on one of its terminals.

According to yet another embodiment, the pumping signals have a frequency between 2 and 50 MHz.

According to a further embodiment, the power supply circuit and the electronic circuit are arranged on a common semiconductor chip. Ideally, the electronic circuit includes a non-volatile data memory and a second charge pump to boost the supply voltage and supply a voltage for erasing or programming the memory.

According to still yet another embodiment, the electronic circuit has a control unit for executing read or write commands for reading or writing the memory received via the antenna circuit.

In accordance with yet another embodiment of the invention, a circuit is provided that includes an antenna circuit for receiving an alternating signal; a rectifier circuit coupled to the antenna circuit and receiving an alternating voltage signal and supplying a direct voltage; an oscillator coupled to the rectifier circuit and receiving the direct voltage from the rectifier circuit and generating two pumping signals having a frequency lower than a frequency of the antenna signals; and a charge pump coupled to the oscillator and receiving the pumping signals therefrom, the charge pump generating a supply voltage that is a multiple of the direct voltage from the rectifier circuit.

The disclosed embodiments also relate to a portable electronic device that includes a portable medium and an integrated circuit according to the present disclosure, the integrated circuit being implanted onto a semiconductor chip and the semiconductor chip being fitted onto or into the portable medium.

BRIEF DESCRIPTION OF THE SEVERAL VIEWS OF THE DRAWING(S)

Figure 2:
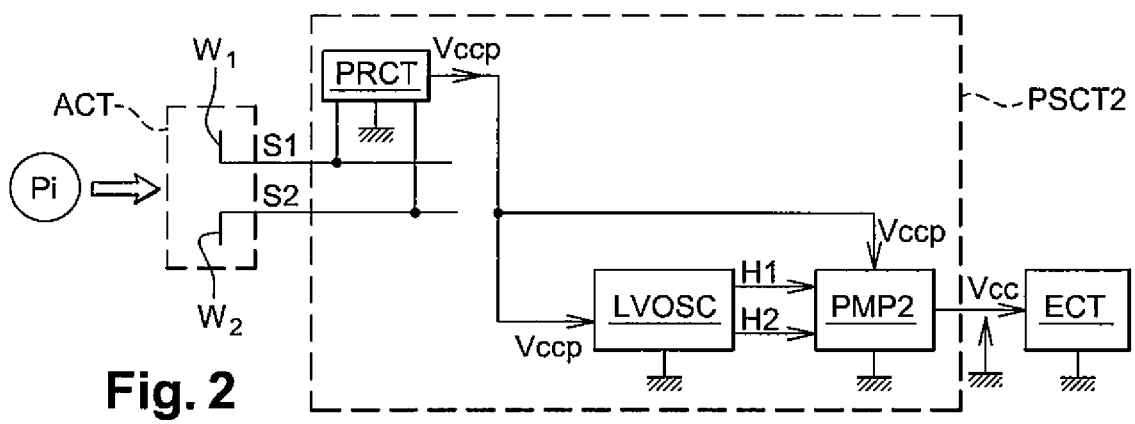
Figure 3:
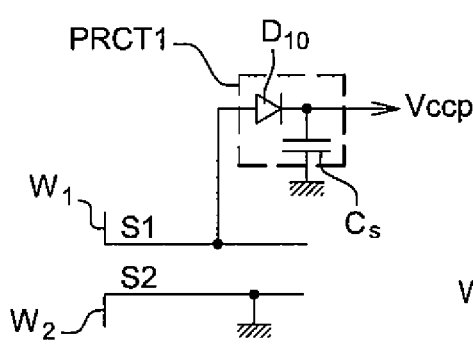
Figure 4:
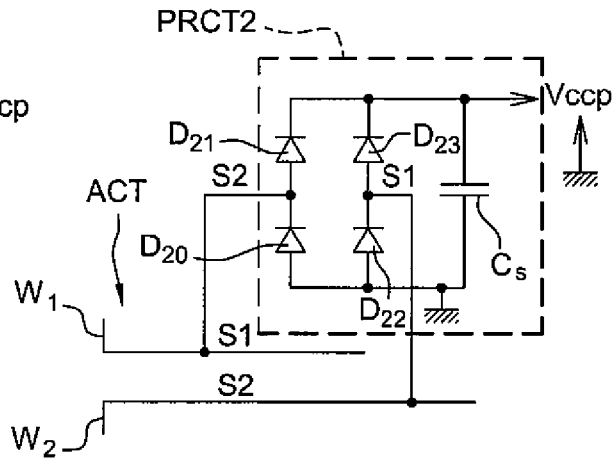
Figure 5:
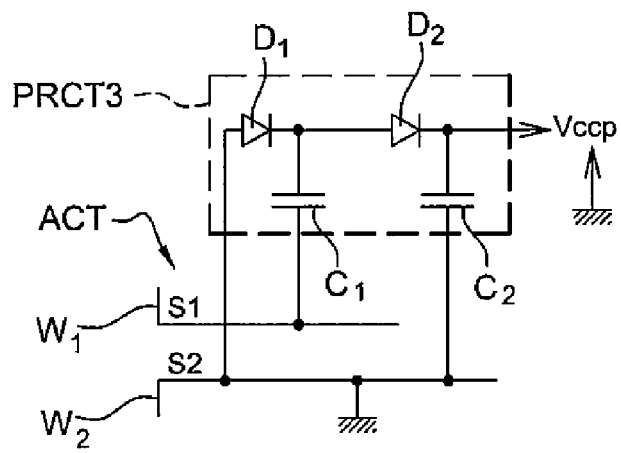
Figure 6:
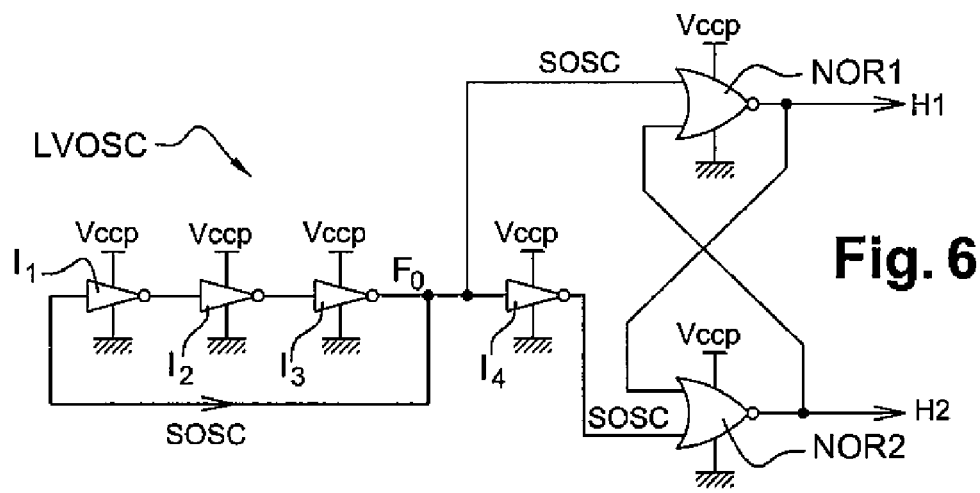
Figure 7A:
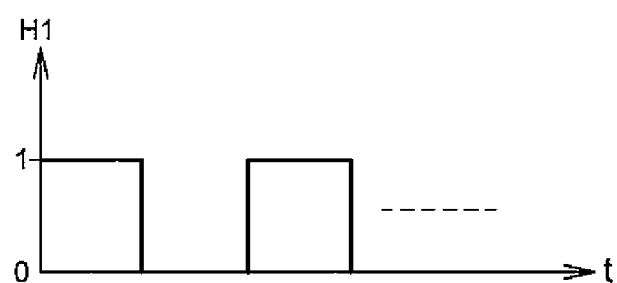
Figure 7B:
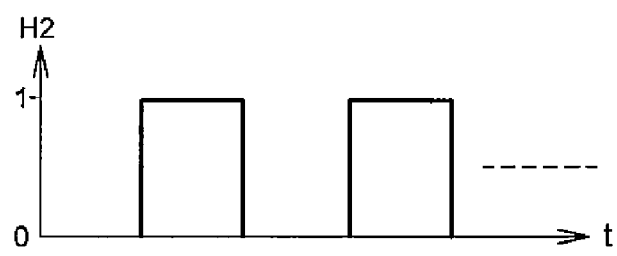
Figure 8:
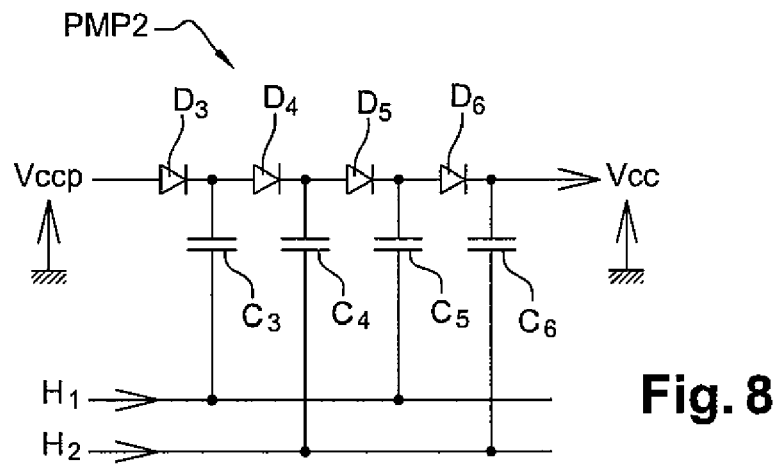
Figure 9:
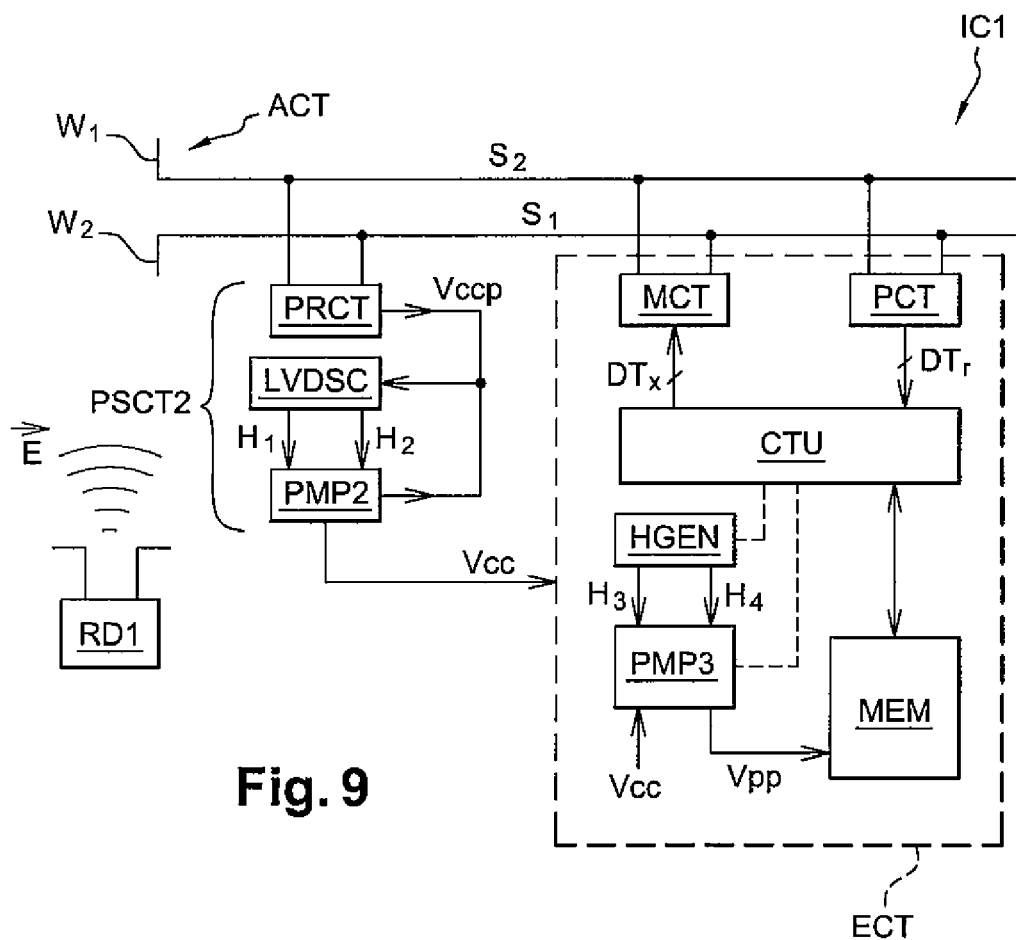

The features and advantages of the present disclosure will be explained in greater detail in the following description of an example of implementation of the method of the present disclosure and of an example of application of the present disclosure to a RFID integrated circuit, given in relation with, but not limited to the following figures, in which:

FIG. 1 described above represents a classic power supply circuit supplying a direct voltage using antenna signals, FIG. 2 represents in block form a power supply circuit according to the present disclosure supplying a direct voltage using antenna signals, FIGS. 3, 4, 5 show three examples of embodiments of a rectifier circuit represented in block form in FIG. 2, FIG. 6 shows an example of an embodiment of an oscillator represented in block form in FIG. 2, FIGS. 7A, 7B show the appearance of pumping signals supplied by the oscillator, FIG. 8 shows an example of an embodiment of a charge pump represented in block form in FIG. 2, and FIG. 9 schematically represents the architecture of a UHF contactless integrated circuit using the power supply circuit according to the present as a main power supply circuit.

DETAILED DESCRIPTION OF THE INVENTION

FIG. 2 represents a power supply circuit PSCT2 according to the present invention, supplying a direct supply voltage Vcc. For this purpose, the circuit PSCT2 is linked to an antenna circuit ACT of the type described above, which includes two conductors W1, W2 supplying antenna signals S1, S2 in the presence of an electric field E.

The circuit PSCT2 includes three elements:
  a primary rectifier circuit PRCT supplying a primary direct voltage Vccp using the antenna signals S1, S2 or using one of these signals,
  a low-voltage oscillator LVOSC electrically powered by the primary voltage Vccp, supplying pumping signals H1, H2, and
  a charge pump PMP2 driven by the pumping signals H1, H2 and supplying the direct voltage Vcc by boosting the primary voltage Vccp.

The primary rectifier circuit PRCT is a single-wave or full-wave rectifier circuit or a low booster circuit. As it will be seen below using examples, this primary circuit preferably has a small number of components to limit UHF losses (losses through stray capacitances due to the high frequency of the signals S1, S2). The greater the number of components operating in UHF mode, the greater will be the electrical losses. Thus, due to the unique structure of this primary rectifier circuit, the primary voltage Vccp obtained is of low value and only represents a fraction of the voltage Vcc. The voltage Vccp is for example equal to a third or quarter of the voltage Vcc targeted and is for example in the order of 0.2 to 0.6 Volt for a voltage Vcc of 1.8 Volts.

The oscillator LVOSC is produced using low-voltage transistors, such as native-type MOS transistors (without doping their channel region) having a low threshold voltage, lower than the primary voltage Vccp. Furthermore, the signals H1, H2 are optimized for the charge pumping and thus have a low-value oscillation frequency F0 situated well below the UHF band, such as a frequency F0 in the order of 2 MHz to 50 MHz for example. Moreover, the signals H1, H2 are preferably square signals, or voltage square waves, in opposite phase and having steep rising and falling edges, within the limits of the technology.

The charge pump PMP2 is a classic charge pump that here has good efficiency as it is driven by the optimized pumping signals H1, H2 and receives the primary voltage Vccp at its pumping input. As a result, this charge pump could generally comprise less pumping stages than a charge pump that would be directly powered by the signals S1, S2 and should supply the same voltage Vcc.

Thanks to the reduction of the UHF losses in the rectifier circuit PRCT and the optimization of the operation of the charge pump PMP2, the efficiency of the power supply circuit PSCT2 is 5 to 25% greater than that of the charge pump PMP1 represented in FIG. 1. This efficiency can be defined as being the ratio Po/Pi between the power Po supplied by the charge pump PMP2 and the incident power Pi absorbed by the antenna circuit.

FIGS. 3, 4, and 5 show three examples of embodiments PRCT1, PRCT2, PRCT3 of the rectifier circuit PRCT.

The rectifier circuit PRCT1 represented in FIG. 3 is a single-wave rectifier circuit comprising a rectifying diode D10 and a smoothing capacitor Cs that supplies the primary voltage Vccp. The anode of the diode D10 is linked to the conductor W1 of the antenna circuit and receives the signal S1, the conductor W2 being connected to the ground of the circuit PRCT1. The cathode of the diode D10 is connected to the anode of the capacitor Cs, the cathode of which is connected to the ground.

The rectifier circuit PRCT2 represented in FIG. 4 is a Graëtz bridge full-wave rectifier circuit, comprising three branches in parallel. The first branch comprises diodes D20, D21 in series, the second branch comprises diodes D22, D23 in series and the third branch is formed by a smoothing capacitor Cs. The anode of the diodes D20, D22 is connected to the ground of the rectifier circuit, as is the cathode of the capacitor Cs. The cathode of the diodes D21, D23 is connected to the anode of the capacitor Cs which supplies the primary voltage Vccp, the cathode of the capacitor being connected to the ground. The midpoint of the diodes D20, D21 is linked to the conductor W1 of the antenna circuit and receives the signal S1. The midpoint of the diodes D22, D23 is linked to the conductor W2 and receives the signal S2. As the Graëtz bridge rectification is of floating type, the conductors W1, W2 are not linked to the ground of the rectifier circuit.

The rectifier circuit PRCT3 represented in FIG. 5 is equivalent to a charge pump stage. More particularly, the circuit PRCT3 is here of the same structure as the first stage of the charge pump PMP1 represented in FIG. 1 and comprises the diodes D1, D2 and the capacitors C1, C2 already described, the references of these elements being unchanged. Thus, the anode of the diode D1 is connected to the conductor W2 which is connected to the ground of the rectifier circuit. The cathode of the diode D1 is connected to the anode of the capacitor C1 and to the anode of the diode D2, the cathode of which is connected to the anode of the capacitor C2. The cathode of the capacitor C1 is connected to the conductor W1 and the cathode of the capacitor C2 is connected to the conductor W2. The anode of the capacitor C2 supplies the voltage Vccp. The rectifier circuit PRCT3 is therefore a low booster: if Vs is the RMS voltage difference between the antenna signals S1, S2 and if Vd is the threshold voltage of the diodes, the theoretical voltage Vccp (without taking any UHF losses into account) is equal to 2 Vs−2 Vd, for example 0.6 Volt if Vs is equal to 0.5 Volt and Vd equal to 0.2 Volt.

FIG. 6 shows an example of an embodiment of the oscillator LVOSC. The oscillator comprises four inverter gates I1, I2, I3, I4 and two gates NOR1, NOR2 with two inputs (EXCLUSIVE OR gates). These various logic gates are produced using low-voltage transistors, and are electrically powered by the primary voltage Vccp.

The gates I1, I2, I3 are arranged in series and the output of the gate I3 is sent back to the input of the gate I1. The gates I1, I2, I3 thus form an oscillator loop called ring oscillator in which an oscillating signal SOSC having an oscillation frequency F0 circulates. This frequency F0 is controlled by designing the transistors forming the inverter gates so as to obtain a determined gate switching time.

The pumping signal H1 is supplied by the gate NOR1 and the pumping signal H2 is supplied by the gate NOR2. For this purpose, the first input of the gate NOR1 receives the signal SOSC, which is for example taken off at the output of the gate I3, and the second input of this gate is connected to the output of the gate NOR2. The first input of the gate NOR2 is supplied by the gate I4 and receives an inverted SOSC signal that is the opposite polarity of the signal SOSC, and the second input of this gate is connected to the output of the gate NOR1. The two gates thus form the equivalent of an RS flip-flop which receives the inverted SOSC signal at its R input (Reset) and the signal SOSC at its S input (Set). Thus, this circuit consumes little electrical energy, and the two pumping signals H1, H2, represented in FIGS. 7A, 7B, are in opposite phase, square in shape, and do not overlap (disregarding the switching time of the gates NOR1, NOR2, i.e., the slopes of the rising and falling edges of the signals H1, H2).

Those skilled in the art will note that a ring oscillator does not generally have an oscillation frequency that is stable in time and according to the temperature. However, a stable frequency is in no way required to implement the present invention, and any variations in the frequency F0, in the order of a few percent, have an insignificant impact on the gain of the charge pump PMP2.

FIG. 8 shows an example of an embodiment of the charge pump PMP2. The charge pump comprises two pumping stages and is here of the same structure as the last two stages of the charge pump PMP1 represented in FIG. 1. The first stage thus comprises the input diode D3, the input capacitor C3, the output diode D4 and the output capacitor C4, the references of these elements remaining unchanged. The second and last stage comprises the input diode D5, the input capacitor C5, the output diode D6 and the output capacitor C6. In each stage, the cathode of the input diode D3, D5 is connected to the anode of the input capacitor C3, C5 and to the anode of the output diode D4, D6, the cathode of which is connected to the anode of the output capacitor C4, C6. The cathode of the input capacitor C3, C5 receives the signal H1, and the cathode of the output capacitor C4, C6 receives the signal H2. The anode of the diode D3 receives the primary voltage Vccp, the cathode of the diode D4 is connected to the anode of the diode D6 and the capacitor C6 supplies the voltage Vcc.

When the circuit PRCT is produced as shown in FIG. 5 (circuit PRCT3) and the charge pump produced as shown in FIG. 8, it appears that the power supply circuit PSCT2 according to the present invention is obtained by splitting the classic charge pump PMP1 (FIG. 1) into a first part used to supply the primary voltage Vccp and into a second part used to supply the voltage Vcc, by interposing the oscillator LVOSC between the first and the second part, to supply the second part with optimized pumping signals. Thus, the present design only requires the addition of a few components so as to form the oscillator LVOSC, and this is clearly compensated by the improvement in the efficiency of the power supply circuit.

In one application, the voltage Vcc supplies an electronic circuit ECT, which is represented in block form in FIG. 2. The power supply circuit PSCT2 and the electronic circuit ECT are preferentially produced on a same semiconductive substrate. They each have their own feeder, one to carry the primary voltage Vccp, the other to carry the supply voltage Vcc, and a common ground line. The primary rectifier circuit PRCT can however be implanted onto a specific low-UHF-loss substrate (for example a ceramic substrate for microwave circuit) if the intended application so permits and if this is justified (for example if the operating frequency is extremely high and is situated in the extreme limit of the UHF band).

FIG. 9 shows an example of an embodiment of a contactless integrated circuit IC1 that includes:

1) the antenna circuit ACT comprising the conductors W1, W2, 2) the power supply circuit PSCT2 according to the present disclosure, and 3) an electronic circuit ECT for UHF transponder, powered by the direct voltage Vcc supplied by the circuit PSCT2.

In the presence of an electric field E sent by a reader RD1, the antenna signals S1, S2 activate the power supply circuit PSCT2, which then supplies the circuit ECT with the voltage Vcc. The integrated circuit IC1 then switches from the OFF state to an ON state.

The circuit ECT here comprises a modulator circuit MCT and a demodulator circuit DCT linked to the antenna circuit, a control unit CTU, a non-volatile memory MEM, such as an EEPROM memory for example (electrically erasable and programmable ROM memory), a charge pump PMP3 and a generator HGEN.

The charge pump PMP3 receives the voltage Vcc as an input voltage to be boosted, and supplies a high voltage Vpp for erasing and programming the memory MEM, for example a voltage in the order of 10 to 15 Volts. The generator HGEN is powered by the voltage Vcc and supplies the charge pump PMP3 with pumping signals H3, H4. The activation of the charge pump PMP3 and of the generator HGEN is controlled by the control unit CTU and occurs when data must be written in the memory.

During a communication with the integrated circuit IC1, the reader RD1 sends data DTr by modulating the electric field E, by applying an amplitude modulation to the electric field for example. The amplitude modulation affects the antenna signals S1, S2. The circuit DCT demodulates the signals S1, S2 and supplies the unit CTU with the data DTr carried by these signals.

The control unit CTU supplies the modulation circuit MCT with data DTx to be sent, generally in coded form, and the latter modulates the impedance of the antenna circuit ACT according to these data. Such an impedance modulation is reflected in the reader RD1 in the form of an auxiliary antenna signal appearing in its own antenna circuit. The reader RD1 extracts this auxiliary signal by means of appropriate filters and deduces the data DTx therefrom.

The unit CTU controls the various elements present in the circuit ECT, monitors the communications and the execution of any security protocols (e.g., verification of passwords), and the execution of commands sent by the reader RD1, particularly read or write commands for reading or writing the memory MEM. The control unit also sends responses to commands via the modulation circuit MCT, in the form of data DTx.

When a write command is received, the unit CTU activates the circuit HGEN so that the charge pump PMP3 receives the pumping signals H3, H4 and supplies the voltage Vpp. The unit CTU then applies a write address and the data to be written to the memory, and then applies the voltage Vpp to the memory MEM by closing a switch circuit or a ramp generator controlling the application of the voltage Vpp to the memory (not represented).

The architecture of the integrated circuit IC1, well known to those skilled in the art, will not be described in greater detail. In particular, the integrated circuit IC1 can be produced in accordance with the EPCTM-GEN2 ("Radio-Frequency Identity Protocols Class-1 Generation-2—UHF RFID Protocol for Communications at 860 MHz-960 MHz") industrial specifications which are in the course of standardization.

The contactless integrated circuits such as the one that has just been described, are generally called RFID (Radio Frequency Identification) integrated circuits and are used in various applications such as the production of electronic tags and the production of contactless chip cards, particularly for electronic purses, access control badges, transport cards, etc.

In addition to UHF contactless integrated circuits, the present invention can also be applied to contactless integrated circuits operating in the presence of an electric field of a frequency greater than the UHF band, such as 10 GHz for example. Generally speaking, the present invention can be applied to any type of contactless integrated circuit requiring an activation field for generating antenna signals and producing a direct voltage using these antenna signals. This activation field can be the electric field described above but can also be a magnetic field.

The present invention can also be applied to PICC-type ("Proximity Inductive Coupling Circuits") circuits, particularly non-UHF integrated circuits conforming to one of the standards ISO/IEC 14443A/B and ISO/IEC 15693. Such circuits operate in the presence of a magnetic field oscillating at 13.56 MHz and their antenna circuit comprises an antenna coil.

Due to the increased efficiency of the power supply circuit, the present invention offers various advantages, particularly a greater communication distance between the integrated circuit and the reader emitting the electric or magnetic activation field.

Although the present invention is initially intended for passive-type integrated circuits, the present invention is also applicable to integrated circuits equipped with an autonomous source of power such as an electric cell. In this case, the voltage Vcc supplied by the power supply circuit according to the present invention can be used as an auxiliary supply voltage, for example in the event the autonomous source of power malfunctions, or to power certain parts of the integrated circuit, or even to recharge the autonomous source of power.

An integrated circuit according to the present invention makes it possible to produce any type of portable electronic object comprising a portable medium on or into which the integrated circuit is fitted.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for supplying an electronic circuit with a direct supply voltage, using high frequency antenna signals, comprising:
    producing a primary direct voltage equal to a fraction of the supply voltage using at least one antenna signal,
    producing at least two pumping signals having a frequency lower than the frequency of the antenna signals, by means of an oscillator electrically powered by the primary voltage, and
    boosting the primary voltage by means of a charge pump driven by the pumping signals, to obtain the supply voltage.

2. The method of claim 1 wherein the primary voltage is produced by single-wave or full-wave rectification of at least one antenna signal.

3. The method of claim 1 wherein the primary voltage is produced by a single-stage charge pump having a first capacitor receiving a first antenna signal on one of its terminals and a second capacitor receiving a second antenna signal on one of its terminals.

4. The method of claim 1 wherein the pumping signals have a frequency between 2 and 50 MHz.

5. The method of claim 1 wherein the low-voltage oscillator, the charge pump, and the electronic circuit are arranged on a common semiconductor chip.

6. The method of claim 1, applied to an electronic circuit comprising a non-volatile memory, and comprising a step of producing a voltage for erasing or programming the memory by boosting the supply voltage by means of a second charge pump.

7. An integrated circuit comprising:
an electronic circuit and a power supply circuit for supplying the electronic circuit with a direct supply voltage using alternating antenna signals, the power supply circuit comprising:
a rectifier circuit receiving at least one of the antenna signals for supplying a primary direct voltage equal to a fraction of the supply voltage,
an oscillator electrically powered by the primary voltage, for supplying at least two pumping signals having a frequency lower than the frequency of the antenna signals, and
a charge pump driven by the pumping signals for boosting the primary voltage and producing the supply voltage.

8. The integrated circuit of claim 7 wherein the rectifier circuit comprises a single-wave rectifier or a full-wave rectifier bridge.

9. The integrated circuit of claim 7 wherein the rectifier circuit is a single stage of a charge pump comprising a capacitor receiving a first antenna signal on one of its terminals and a second capacitor receiving a second antenna signal on one of its terminals.

10. The integrated circuit of claim 7 wherein the pumping signals have a frequency between 2 and 50 MHz.

11. The integrated circuit of claim 7 wherein the power supply circuit and the electronic circuit are arranged on a common semiconductor chip.

12. The integrated circuit of claim 7 wherein the electronic circuit comprises a non-volatile data memory and a second charge pump to boost the supply voltage and supply a voltage for erasing or programming the memory.

13. The integrated circuit of claim 12, comprising a control unit for executing read or write commands for reading or writing the memory received via the antenna circuit.

14. A portable electronic device, comprising a portable medium and an integrated circuit formed on a semiconductor chip and incorporated into the portable medium, the integrated circuit comprising:
an electronic circuit and a power supply circuit for supplying the electronic circuit with a direct current supply voltage using alternating current antenna signals, the power supply circuit comprising:
a rectifier circuit receiving at least one of the antenna signals for supplying a primary direct current voltage equal to a fraction of the supply voltage,
an oscillator electrically powered by the primary voltage and supplying at least two pumping signals having a frequency lower than the frequency of the antenna signals, and
a charge pump driven by the pumping signals for boosting the primary voltage to produce the supply voltage.

15. The device of claim 14 wherein the electronic circuit comprises a non-volatile data memory and a second charge pump to boost the supply voltage and supply a voltage for erasing or programming the memory.

16. The device of claim 15 wherein the integrated circuit comprises a control unit for executing read or write commands for reading or writing the memory received via the antenna circuit.

17. The device of claim 14 wherein the rectifier circuit is a single stage of a charge pump comprising a capacitor receiving a first antenna signal on one of its terminals and a second capacitor receiving a second antenna signal on one of its terminals.

18. A circuit, comprising:
an antenna circuit for receiving an alternating signal;
a rectifier circuit coupled to the antenna circuit and receiving the alternating signal and supplying a direct voltage;
an oscillator coupled to the rectifier circuit and receiving the direct voltage from the rectifier circuit and generating two pumping signals having a frequency lower than a frequency of the antenna signals; and
a charge pump coupled to the oscillator and receiving the pumping signals therefrom, the charge pump generating a supply voltage that is a multiple of the direct voltage from the rectifier circuit.

19. The circuit of claim 18 wherein the oscillator circuit comprises a plurality of inverter gates coupled in series and having an input for receiving the direct voltage from the rectifier circuit and an output coupled to respective inputs of first and second NOR gates, the NOR gates each having an output for generating a respective pumping signals.

20. The circuit of claim 19 wherein the first and second NOR gates have their outputs cross-coupled to an input of the other NOR gate, and one NOR gate receives an inverted direct voltage signal from the rectifier circuit while the other NOR gate receives a noninverted direct voltage signal from the rectifier circuit.

21. The circuit of claim 18 wherein the output of the charge pump is coupled to an electronic circuit for supplying power to the electronic circuit.

* * * * *

UNITED STATES PATENT AND TRADEMARK OFFICE
CERTIFICATE OF CORRECTION

PATENT NO.         : 7,580,694 B2                                              Page 1 of 1
APPLICATION NO. : 11/567917
DATED              : August 25, 2009
INVENTOR(S)        : Piere Rizzo et al.

It is certified that error appears in the above-identified patent and that said Letters Patent is hereby corrected as shown below:

Column 10
Claim 18, Line 30, "a frequency of the antenna signals; and" should read as -- a frequency of the alternating signal; and --.

Signed and Sealed this

Twenty-sixth Day of October, 2010

David J. Kappos
*Director of the United States Patent and Trademark Office*